United States Patent [19]

Tani

[11] 4,387,960
[45] Jun. 14, 1983

[54] MULTI-LAYER ANTI-REFLECTION COATING

[75] Inventor: Hakuzo Tani, Sakai, Japan

[73] Assignee: Minolta Camera Co. Ltd., Sakai, Japan

[21] Appl. No.: 244,342

[22] Filed: Mar. 17, 1981

[30] Foreign Application Priority Data

Mar. 31, 1980 [JP] Japan ............... 55-42629

[51] Int. Cl.³ .................................. G02B 1/10
[52] U.S. Cl. ...................................... 350/164
[58] Field of Search ........................ 350/164, 165

[56] References Cited

U.S. PATENT DOCUMENTS

| | | | |
|---|---|---|---|
| 3,235,397 | 2/1966 | Millendorfer | 350/164 |
| 3,432,225 | 3/1969 | Rock | 350/164 |
| 3,463,574 | 8/1969 | Bastien et al. | 350/164 |
| 3,565,509 | 2/1971 | Sulzback | 350/164 |
| 3,604,784 | 9/1971 | Louderback | 350/164 |
| 3,781,090 | 12/1973 | Sumita | 350/164 |

Primary Examiner—Bruce Y. Arnold
Attorney, Agent, or Firm—Jackson, Jones & Price

[57] ABSTRACT

A multi-layer anti-reflection coating is provided having four layers. The design can be defined by the following parameters:

$N_1 d_1 \cong 0.25 \lambda_o$;
$N_2 d_2 \cong 0.50 \lambda_o$;
$0.50 \lambda_o \leq N_3 d_3 \leq 0.75 \lambda_o$;
$N_4 d_4 < 0.25 \lambda_o$;
$1.35 \leq N_1 \leq 1.62$;
$1.90 \leq N_2 \leq 2.30$;
$1.90 \leq N_4 \leq 2.30$;
$1.56 \leq N_3 \leq 1.80$; and
$N_1 < N_3$ wherein N refers to the refractive index, d refers to the physical thickness with their respective subnumbers referring to the layer, with the fourth layer being the layer closest to the substrate, and $\lambda_o$ refers to a preselected design wavelength.

24 Claims, 6 Drawing Figures

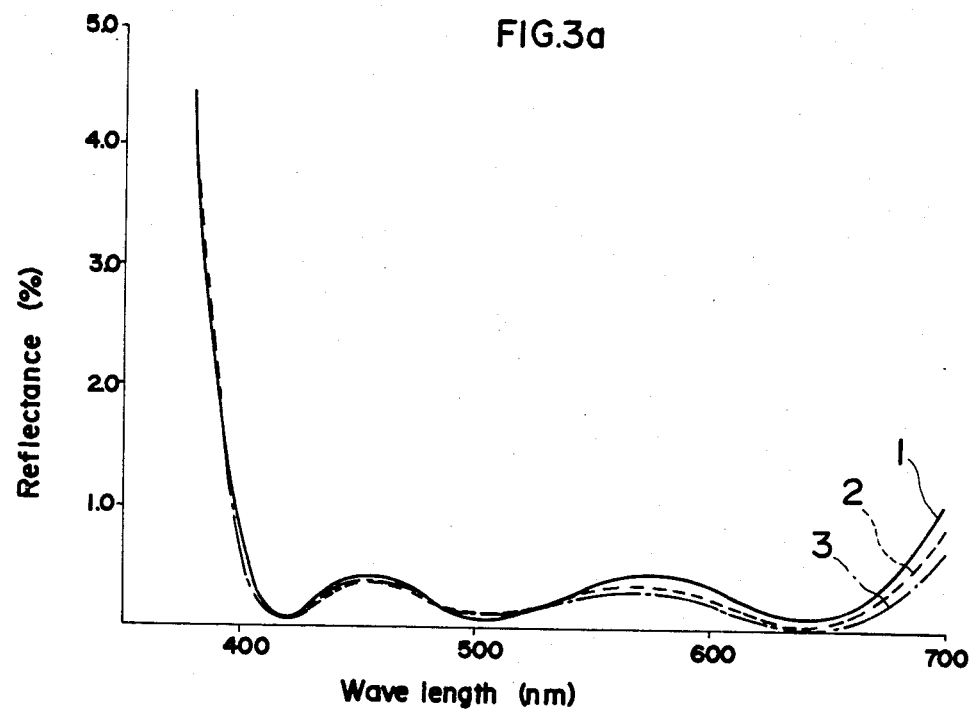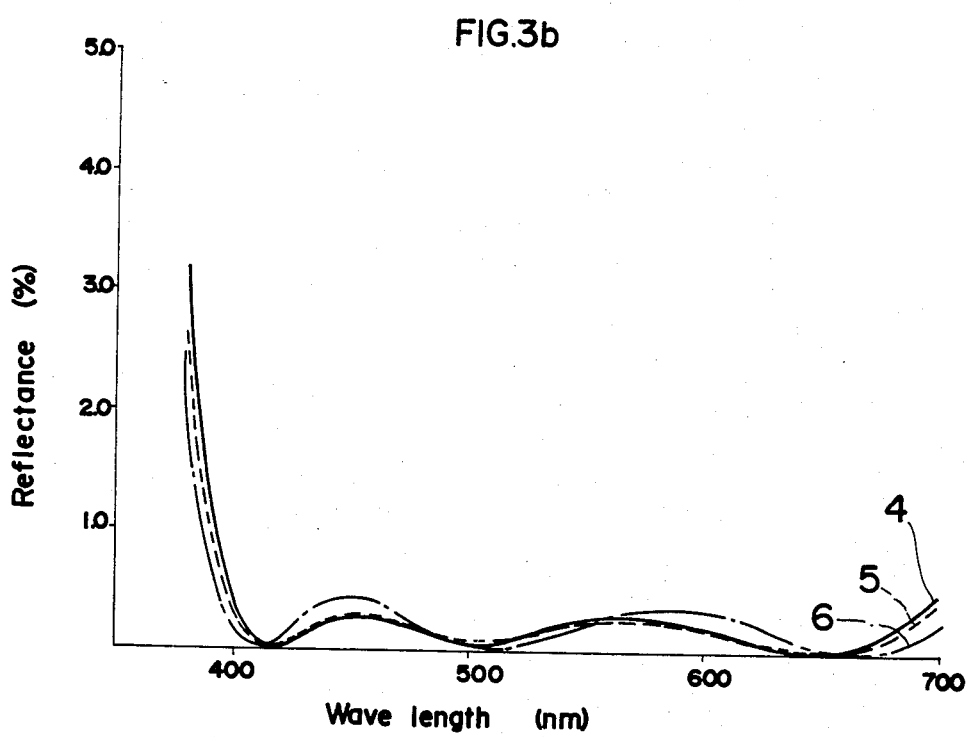

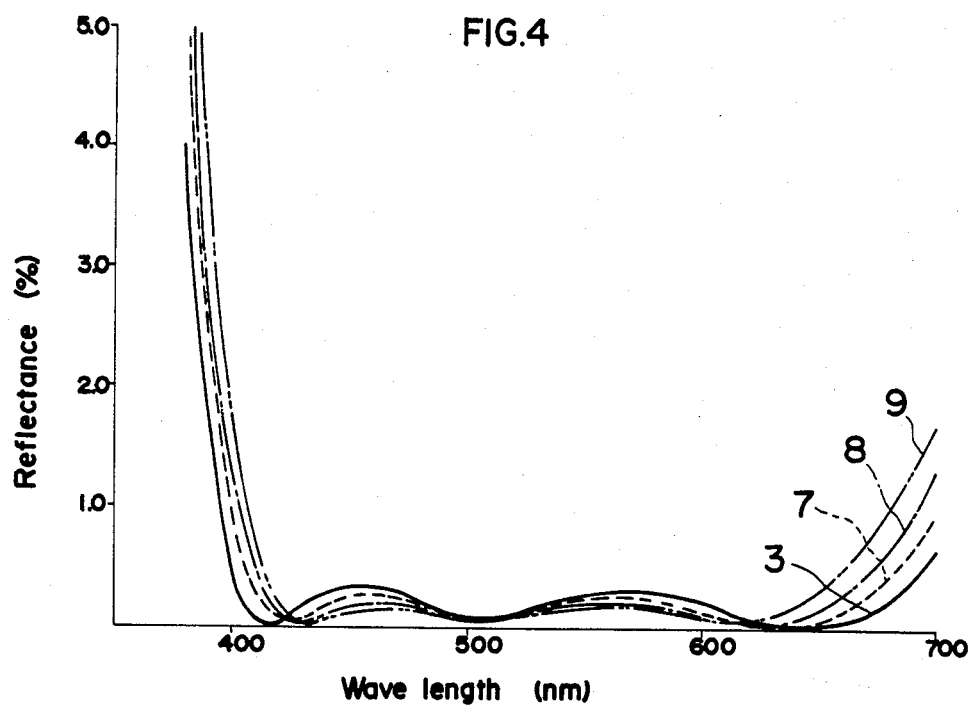
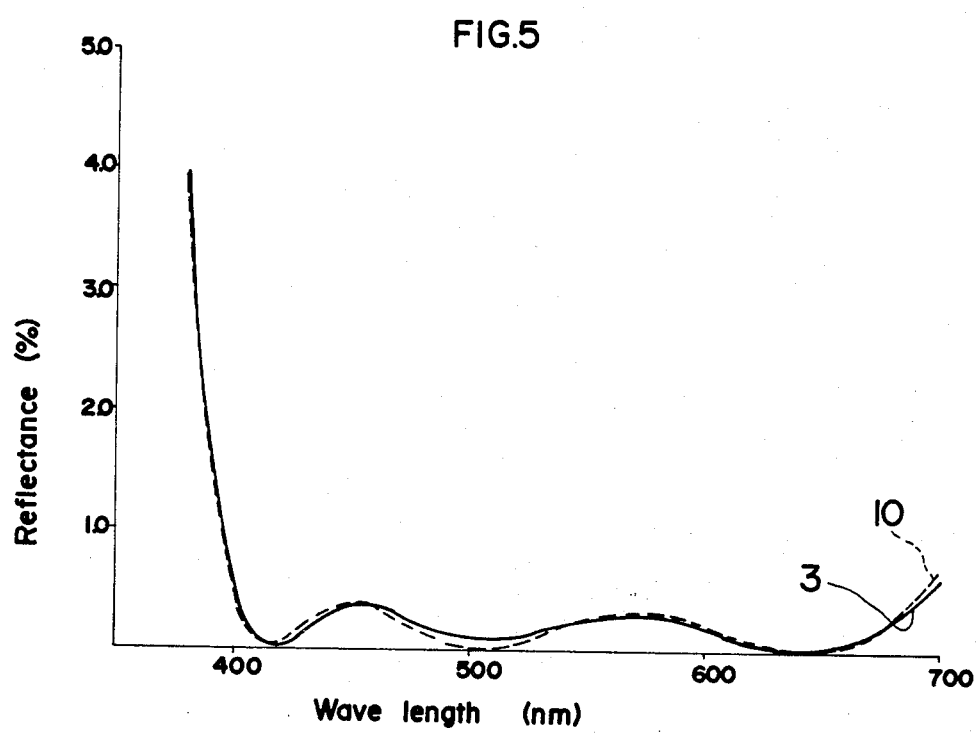

MULTI-LAYER ANTI-REFLECTION COATING

BACKGROUND OF THE INVENTION

1. Field of the Invention

The present invention relates to a multi-layer anti-reflection coating to be applied to a substrate and more particularly, to an anti-reflection coating design that is particularly susceptible to production line manufacturing.

2. Description of the Prior Art

A considerable number of anti-reflection coatings have been suggested in the prior art for a primary design purpose of ensuring that the residual reflectance will be held to a relatively small value over the entire range of the visual spectrum. While experience has shown that single or double layer coatings have provided significant improvement, the residual reflectance is still less than desired, and the range of suppressing the reflectance over the visual spectrum is necessarily limited.

To improve these restrictions, the prior art has resorted to anti-reflection coatings having three or more layers, such as disclosed in U.S. Pat. No. 3,604,784. This three-layer anti-reflection coating includes an outer or first layer adjacent the air medium of $MgF_2$ (N=1.38) with an optical thickness of $\lambda o/4$ wherein $\lambda o$ is a predetermined design wavelength approximately in the center of the visual spectrum. The second layer is a mixture of oxides of titanium and $Al_2O_3$ (N≈2.00) with an optical thickness of $\lambda o/2$. The third layer adjacent the glass substrate is of $Al_2O_3$ or MgO (N=1.64 to 1.72) with an optical thickness of $\lambda o/2$. A major limitation for this type of multi-layer anti-reflection coating is that it generally has sufficient anti-reflection effect only on a glass substrate with a refractive index in the range of 1.68 to 1.88. Regrettably, this necessitates an expensive glass composition.

The prior art has further attempted to obtain anti-reflection coatings that would be effective for all the conventional glass substrates, and a variety of four-layer anti-reflection coatings have been proposed. These coatings include the structure disclosed in U.S. Pat. No. 3,781,090 which has the following construction of layers, in sequence from the air side to the glass substrate side, the first layer is made of a material having a low index of refraction (N=1.35 to 1.62); the second layer has a high index of refraction (N=2.00 to 2.30); the third layer has a medium index of refraction (N=1.56 to 1.72), while the final fourth layer has a low index of refraction (N=1.35 to 1.62). This design provides a four layer anti-reflection coating with enhanced anti-reflection effects on a glass substrate having a refractive index in the range of 1.42 to 1.72 as a result of adjusting each layer thickness in accordance with the refractive index of the glass substrate. While an improvement in the anti-reflectance characteristics of the coating is found, there are still a number of disadvantages in the structure disclosed in this patent. In controlling the optical thickness of each deposited layer, an optical monitoring method using light interference has been generally utilized. In implementing this method, glass of low refractive index, such as soda lime glass (N≈1.52), is often used as a monitor because of its low cost and easy attainability. For enhancing the accuracy of the thickness control, it has been found desirable that the fourth layer, which is the first coated on the monitor glass, is made of a material whose refractive index is significantly different from that of the monitored glass. However, the design of U.S. Pat. No. 3,781,090 utilizes a fourth layer that is composed of a material having a low index of refraction in the range of 1.35 to 1.62 which is only slightly different from that of the monitored glass. Thus, accurate control of the optical thickness of the fourth layer is particularly difficult with the optical monitoring method. Finally, it is considered desirable, for enhancing the optical characteristics, that $MgF_2$, which has the greatest difference in refractive index from the monitored glass from the practical applicable materials available in anti-reflection coatings, be used for the fourth layer. It is also desirable that $MgF_2$ be used as the first or outer layer since it resists scratching and has one of the lowest indices of refraction of all the practical applicable materials for coating. A problem exists, however, when using a layer of $MgF_2$, since when deposited, it is microscopically uneven across its surface as compared to other materials. Thus, by incorporating $MgF_2$ into two layers in a four layer anti-reflection coating, the resulting surface of the coating is considerably uneven. This results in a decrease in durability as demonstrated by a standard adhesion test which is performed by abrading the coating with a stream of fine silicon carbide particles dropped from a known height.

U.S. Pat. No. 3,892,490 is cited of general interest for disclosing a monitor system for controlling the depositing of layers upon a glass substrate. U.S. Pat. Nos. 3,565,509, 3,463,574, 3,432,225, and 3,235,397 are cited of general interest.

SUMMARY OF THE INVENTION

A primary object of the present invention is to provide an anti-reflection coating which facilitates a precise control of the optical thickness of each layer when using an optical monitoring method. Another object is to maintain a sufficient anti-reflection effect for various glass substrates having a refractive index over a wide range with improved optical characteristics and durability.

The present invention provides a four layer anti-reflection coating which provides a flexible applicability to various glass substrates of widely different refractive indices. The anti-reflection coating is characterized by having a high index of refraction on the fourth layer that is initially coated on the monitor glass and a relatively thin optical thickness. The present design also limits the applicability of magnesium fluoride, $MgF_2$, as only one of the layers while permitting the optical thickness of each layer to be adjusted according to the refractive index of the glass substrate.

The refractive index of each material is identified by the symbol N with a subnumber referring to the layer position with the first layer being adjacent the air medium and the fourth layer being on the substrate. As is known, the optical thickness is generally described in fractions of the wavelength of a design light ray for which the coating is to be used. Frequently, the design wavelength will be 510 nanometers and is referred to herein as $\lambda o$. The optical thickness is the product of the refractive index times the physical thickness, Nd, as known in the art. The refractive indices and optical thicknesses of the respective layers of the present invention are set forth as follows:

$N_1 d_1 \approx 0.25 \lambda o$;
$N_2 d_2 \approx 0.50 \lambda o$;

$0.50 \lambda_o \leq N_3 d_3 \leq 0.75 \lambda_o;$
$N_4 d_4 < 0.25 \lambda_o;$
$1.35 \leq N_1 \leq 1.62;$
$1.90 \leq N_2 \leq 2.30;$
$1.90 \leq N_4 \leq 2.30;$
$1.56 \leq N_3 \leq 1.80;$ and
$N_1 < N_3$ The first layer consists of material selected from a group comprising $MgF_2$, $LaF_2$, $Na_3(AlF_4)$ and $SiO_2$. The second and fourth layers comprise material selected from a group of $ZrO_2$, $TiO_2$, $CeO_2$, $HfO_2$, $ZnS$ and a mixture of $ZrO_2$ and $TiO_2$. Finally, the third layer is selected from a group comprising $Al_2O_3$, $CeF_3$, $Y_2O_3$, $Gd_2O_3$, and $MgO$.

The optical thickness of each layer in the anti-reflection coating can be varied to adjust the design to the refractive index of the selected glass substrate within the range that satisfies the above conditional equations. As a result of this design, it is possible to obtain an anti-reflection coating with a sufficient anti-reflection effect on a glass substrate having an index of refraction within the wide range of 1.42 to 1.90.

In addition, in accordance with the design objectives of the present invention, a material having a high index of refraction from 1.90 to 2.30 is used for the fourth layer that is coated directly on the monitor glass to thereby improve the accuracy of layer thickness control by means of an optical monitoring method. This approach greatly facilitates the use of a low cost and easily obtainable material like soda lime glass for the monitor while still permitting a precision thickness control of the respective layers with an optical monitoring method.

Finally, according to the present invention, the materials that are capable of being used for the respective layers are those known materials which are optically stable and chemically and mechanically durable and whose refractive indices would satisfy the above conditional equations. Thus, a versatile anti-reflection coating design is provided that results in an easy to produce, highly durable anti-reflecting coating applicable to a significantly large number of glass substrates.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIGS. 3a and 3b are reflectance graphs for six different embodiments of the present invention illustrated in Table I;

FIG. 4 is a reflectance graph for the embodiments illustrated in Table II; and

FIG. 5 is a reflectance graph for the embodiments disclosed in Table III.

DESCRIPTION OF THE PREFERRED EMBODIMENTS

The following specification, taken in conjunction with the drawings, sets forth the preferred embodiment of the present invention in such a manner that any person skilled in the optical field can use the invention. The embodiments of the invention disclosed herein are the best modes contemplated by the inventor for carrying out his invention in a commercial environment, although it should be understood that various modifications can be accomplished within the parameters of the present invention.

Figure 1:
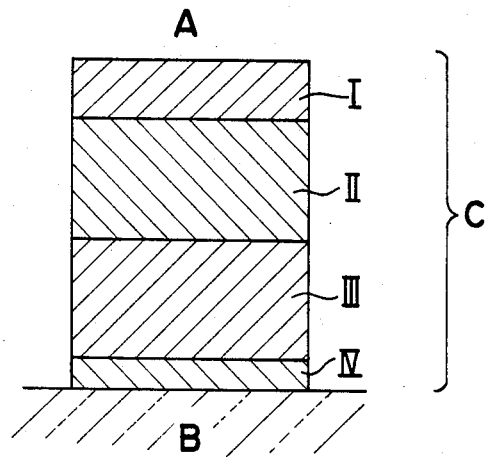
FIG. 1 is a schematic cross sectional view of an anti-reflective coating of the present invention.

Referring to FIG. 1, a schematic cross-sectional view of the structure of the anti-reflection coating of the present invention is disclosed. The anti-reflection coating C is applied to the surface of a substrate such as a glass with the outermost layer being adjacent the air medium A. The anti-reflection coating C comprises a four-layer structure consisting of a first layer I, a second layer, II, a third layer, III, and a fourth layer, IV, in sequence from the air side to the glass substrate side.

The first layer I is made of a material having a low index of refraction in the range of 1.35 to 1.62, such as $MgF_2$, $SiO_2$, $LaF_2$, and $Na_2(AlF_4)$, and is approximately 0.25 $\lambda_o$ in optical thickness with respect to a design wavelength, $\lambda_o$. A second layer II is composed of a material with a high index of refraction ranging from 1.90 to 2.30, such as $ZrO_2$, $TiO_2$, $CeO_2$, $HfO_2$, $ZnS$ and a mixture of $ZrO_2$ and $TiO_2$, and is approximately 0.50 $\lambda_o$ in optical thickness. A third layer III is made from a material with a medium index of refraction ranging from 1.56 to 1.80, such as $A_2O_3$, $CeF_3$, $MgO$, $Y_2O_3$ and $Gd_2O_3$, and is within a range of 0.50 $\lambda_o$ to 0.75 $\lambda_o$ in optical thickness. The material used for the third layer III is higher in refractive index than the material applied to the first layer I. A fourth layer IV consists of a material having a high index of refraction ranging from 1.90 to 2.30, such as $ZrO_2$, $TiO_2$, $CeO_2$, $HfO_2$, $ZnS$ and a mixture of $ZrO_2$ and $TiO_2$, and is less than 0.25 $\lambda_o$ in optical thickness and more specifically is within a range of 0.40 $\lambda_o$ to 0.010 $\lambda_o$ in the embodiments disclosed herein.

The materials used for the respective layers are first selected, and then the optical thicknesses of respective layers are set to optimum values so that a sufficient anti-reflection effect may be obtained for a particular glass substrate B to be used. Thus, optimum values are determined, for example, as follows, assuming that the first boundary is between air A and a first layer I, the second boundary between the first layer I and a second layer II, the third boundary between the second layer II and a third layer III, the fourth boundary between the third layer III and a fourth layer IV, and the fifth boundary between the fourth layer IV and the glass substrate B. The refractive indices of air A, and the first layer I through the fourth layer IV and glass substrate, B, are $N_0$, $N_1$, $N_2$, $N_3$, $N_4$, and $N_5$, respectively, in that order. In this case, the Fresnel coefficient Wi at the i-th boundary (i=1, 2, 3, 4, and 5) is defined by the following equation:

$$Wi = \frac{N_{i-1} - N_i}{N_{i+1} + N_i} \quad (1)$$

The Fresnel coefficient, Wi, is determined when each layer material and a glass substrate have been selected.

In addition, the phase $\beta i$ of the light ray caused by the anti-reflection coating is represented by the following equation (2) if the light ray, which is incident from the air to substrate side, passes through the i-th boundary and then returns to the i-th boundary by way of reflection of the (i+1)-th boundary:

$$\beta i = 2 \frac{2\pi}{\lambda o} Nidi \quad (2)$$

wherein Nidi represents the optical thickness of the i-th layer, and $\lambda o$ represents a design wavelength of the light ray. Since the present invention provides $N_1 d_1 \approx 0.25 \lambda o$ and $N_2 d_2 \approx 0.50 \lambda o$, $\beta_1 = \pi$ and $\beta_2 = 2\pi$ are approximately used in the calculation.

Figure 2:
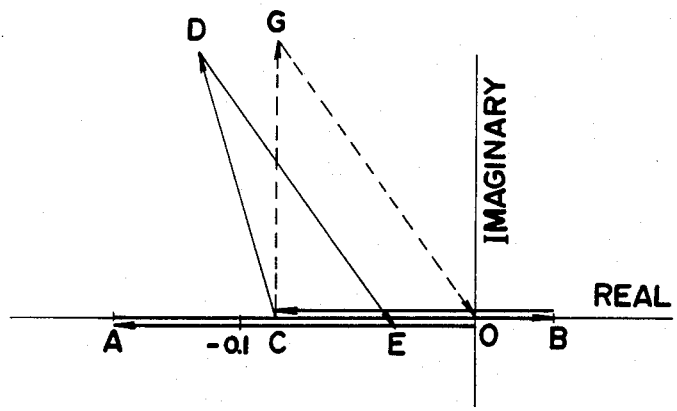
FIG. 2 is a vector diagram for use in determining the optimum layer thicknesses.

A vector diagram as shown in FIG. 2 can accordingly be drawn, in which the interaction between the light rays reflected on the respective boundaries for wavelength $\lambda o$ are represented by means of the complex amplitude and phase of the light rays. Referring to FIG. 2, vector $\overrightarrow{OA}$ shows the complex amplitude of the light rays reflected on the first boundary, vector $\overrightarrow{AB}$ indicates the complex amplitude of the light rays reflected on the second boundary and vector $\overrightarrow{BC}$ represents the complex amplitude of the light rays reflected on the third boundary. The length of each vector is directly related to the absolute value of the Fresnel coefficient at each boundary, while the direction of each vector is determined by the value of $\beta$ and by whether the Fresnel coefficient is positive or negative, i.e., the direction of the vector is determined by the phase angle related to $\beta i$ measured in a counterclockwise direction when the Fresnel coefficient is positive, and measured in a clockwise direction when negative. Similarly, vectors $\overrightarrow{CD}$ and $\overrightarrow{DE}$ indicate the complex amplitudes of the light rays reflected on the fourth and fifth boundaries, respectively. The square of the distance from original 0 to the end point of the vector represents the residual reflectance of an anti-reflection coating. However, since the optical thicknesses of the third layer III and fourth layer IV have not been determined, it is impossible to fully depict the vectors $\overrightarrow{CD}$ and $\overrightarrow{DE}$. Therefore, a circle located at point C in its center with a radius related to $W_4$ and another circle located at origin 0 in its center with a radius related to the $W_5$ are drawn. The intersecting point of these two circles is labeled G, and vectors $\overrightarrow{CG}$ and $\overrightarrow{GO}$ are depicted. From the direction of the vectors, the optical thicknesses of the third layer III and fourth layer IV are determined. The optical thicknesses determined above are the optimum values to make the residual reflectance theoretically zero with respect to wavelength $\lambda o$. With these values for optical thickness adopted as an approximate solution, the layer thicknesses are corrected by a computer in accordance with the damped least square method, which is one of the most suitable methods for automatic lens design, to seek a final solution which shows relatively low and flat reflection characteristics over a wide range of wavelengths, whereby the final optimum layer thicknesses are obtainable.

Listed below are definite constructions of various embodiments according to the present invention, in which the design wavelength $\lambda o$ is set at 510 nanometers and Ns represents the refractive index of a glass substrate B. As can be appreciated, the theoretical design is also applicable to a plastic substrate.

In embodiments 1 to 6 listed in Table 1, $MgF_2$ with a refractive index of 1.385 is used for the first layer I, for its stable optical characteristics and its good resistance to humidity and physical scratches; a mixture of $ZrO_2$ and $TiO_2$ (refractive index, 2.05) is used for the second and fourth layers II, IV, for its stable optical characteristics and good resistance to the effects of humidity, and $Al_2O_3$ (refractive index, 1.62) is used for the third layer III, for its good resistance to the effects of humidity and physical scratches, respectively. The optical thickness of each layer is set to an optimum value determined by the previously described method.

The anti-reflection coating is produced by evaporating a mixture of $ZrO_2$ and $TiO_2$ for the fourth layer, $Al_2O_3$ for the third layer, a mixture of $ZrO_2$ and $TiO_2$ for the second layer, and $MgF_2$ for the first layer in that order on the surface of the preselected glass substrate.

TABLE 1

| | Material | Refractive Index | Emb. 1 | Emb. 2 | Emb. 3 | Emb. 4 | Emb. 5 | Emb. 6 |
|---|---|---|---|---|---|---|---|---|
| | | | | | Optical Thickness | | | |
| first layer | $MgF_2$ | 1.385 | $0.249 \lambda_o$ | $0.250 \lambda_o$ | $0.251 \lambda_o$ | $0.249 \lambda_o$ | $0.249 \lambda_o$ | $0.249 \lambda_o$ |
| second layer | mixture of $ZrO_2$ and $TiO_2$ | 2.05 | $0.498 \lambda_o$ | $0.500 \lambda_o$ | $0.501 \lambda_o$ | $0.501 \lambda_o$ | $0.498 \lambda_o$ | $0.497 \lambda_o$ |
| third layer | $Al_2O_3$ | 1.62 | $0.699 \lambda_o$ | $0.648 \lambda_o$ | $0.605 \lambda_o$ | $0.566 \lambda_o$ | $0.530 \lambda_o$ | $0.513 \lambda_o$ |
| fourth layer | mixture of $ZrO_2$ and $TiO_2$ | 2.05 | $0.014 \lambda_o$ | $0.027 \lambda_o$ | $0.035 \lambda_o$ | $0.036 \lambda_o$ | $0.024 \lambda_o$ | $0.020 \lambda_o$ |
| substrate | glass | | Ns = 1.46 | Ns = 1.54 | Ns = 1.62 | Ns = 1.70 | Ns = 1.78 | Ns = 1.86 |

FIGS. 3a and 3b show the percent of reflectance versus wavelength curves for embodiments 1-6 listed in Table 1, the curves being plotted for vertically incident light. Curves 2 and 3 in FIG. 3a indicate the spectral reflectance characteristics of embodiments 1-3, respectively, and curves 4, 5 and 6 in FIG. 3b represent the spectral reflectance characteristics of embodiments 4-6. As is clear from FIGS. 3a and 3b, by adjusting only the optical thicknesses of respective layers whose material is preselected above, an anti-reflection coating having a broad anti-reflection spectral range and minimized residual reflectance is obtainable for any one of a number of glass substrates whose refractive indices widely vary. Furthermore, the anti-reflection coatings of the present embodiments are composed of optically stable and highly durable materials for the respective layers, whereby the coating is optically stable, easy to produce, and durable as a whole.

Embodiments 7-9 listed in the following Table 2 are to show changes in the anti-reflection effect caused by variations in the refractive index of material for the second layer II in the above embodiment 3 (the refractive index of the glass substrate Ns is 1.62). These variations are produced by changing the mixing ratio of $ZrO_2$ and $TiO_2$, and/or by the change of evaporating conditions, etc. For comparison, the construction of embodiment 3 is also given in Table 2.

TABLE 2

| | Emb. 3 | Emb. 7 | Emb. 8 | Emb. 9 | Optical Thickness |
|---|---|---|---|---|---|
| | | Refractive Index | | | |
| first layer | 1.385 | 1.385 | 1.385 | 1.385 | $0.251 \lambda_o$ |
| second layer | 2.05 | 2.10 | 2.15 | 2.20 | $0.501 \lambda_o$ |
| third layer | 1.62 | 1.62 | 1.62 | 1.62 | $0.605 \lambda_o$ |
| fourth layer | 2.05 | 2.05 | 2.05 | 2.05 | $0.036 \lambda_o$ |
| substrate glass | | Ns = 1.62 | | | |

TABLE 3

| | Material | Refractive Index | Optical Thickness |
|---|---|---|---|
| first layer | $MgF_2$ | 1.385 | $0.251 \lambda_o$ |
| second layer | mixture of $ZrO_2$ and $TiO_2$ | 2.05 | $0.501 \lambda_o$ |
| third layer | MgO | 1.70 | $0.632 \lambda_o$ |
| fourth layer | mixture of $ZrO_2$ and $TiO_2$ | 2.05 | $0.035 \lambda_o$ |
| substrate | glass | 1.62 | |

The anti-reflection coatings of embodiments 7–9 are produced in the same manner as in embodiments 1–6. The desired refractive indices are obtainable by varying the mixture ratio of $ZrO_2$ and $TiO_2$ and/or evaporating conditions when the second layer II is evaporated.

Curves 7, 8 and 9 in FIG. 4 show the spectral reflectance characteristics for vertically incident light as set forth in embodiments 7, 8 and 9. For reference, curve 3 which represents the spectral reflectance characteristics for embodiment 3 is also indicated in FIG. 4. As is clear from FIG. 4, the higher the refractive index of the second layer II, the lesser the residual reflectance of the spectrum range in the vicinity of the design wavelength.

Embodiment 10 listed in the above Table 3 represents a further modification of embodiment 3 wherein $Al_2O_3$ (refractive index of 1.62) which is used for the third layer III in embodiment 3 is changed to MgO having a refractive index of 1.70 with the thicknesses of the respective layers also suitably adjusted.

The anti-reflection coating according to the present embodiment is produced by sequentially evaporating a mixture of $ZrO_2$ and $TiO_2$, MgO, a mixture of $ZrO_2$ and $TiO_2$, and $MgF_2$ of respective preset layer thicknesses on the surface of a glass substrate.

Curve 10 in FIG. 5 shows the reflectance characteristics for vertically incident light for embodiment 10. Curve 3 in FIG. 5 indicates the spectral reflectance characteristics of embodiment 3. As is clear from FIG. 5, the spectral reflectance characteristics, which are almost equal to the original design, are available through the adjustment of each layer thickness, even if the refractive index of the third layer III is changed.

While the preferred embodiments have been disclosed in an enabling manner to facilitate the reproduction of the present invention, it should be realized that various modifications can be easily accomplished by a person skilled in this field, and, accordingly, the present invention should be measured solely from the following claims:

What is claimed is:

1. A multi-layered anti-reflection coating for use with a glass substrate to reduce reflectance of light comprising four layers, the first layer furthest from the substrate having a refractive index, $N_1$ and an optical thickness $N_1 d_1$, the second layer having a refractive index $N_2$ and an optical thickness $N_2 d_2$, the third layer having a refractive index $N_3$ and an optical thickness $N_3 d_3$ and the fourth layer closest to the substrate having a refractive index $N_4$ and an optical thickness $N_4 d_4$, wherein the refractive indices and the optical thicknesses are related as follows with respect to a preselected design wavelength, $\lambda_o$:

$N_1 d_1 \approx 0.25 \lambda_o$;
$N_2 d_2 \approx 0.50 \lambda_o$;
$0.50 \lambda_o \leq N_3 d_3 \leq 0.75 \lambda_o$;
$N_4 d_4 < 0.25 \lambda_o$;
$1.35 \leq N_1 \leq 1.62$;
$1.90 \leq N_2 \leq 2.30$;
$1.90 \leq N_4 \leq 2.30$;
$1.56 \leq N_3 \leq 1.80$; and
$N_1 < N_3$ 2. A multi-layered anti-reflection coating as in claim 1 wherein the first layer is selected from a group consisting of $MgF_2$, $LaF_2$, $Na_3(AlF_4)$ and $SiO_2$.

3. A multi-layered anti-reflection coating as in claim 1 wherein the second and fourth layers are selected from a group consisting of $ZrO_2$, $TiO_2$, $CeO_2$, $HfO_2$, ZnS and a mixture of $ZrO_2$ and $TiO_2$.

4. A multi-layered anti-reflection coating as in claim 1 wherein the third layer is selected from a group consisting of $Al_2O_3$, $CeF_3$, $Y_2O_3$, $Gd_2O_3$ and MgO.

5. A multi-layered anti-reflection coating for use with a substrate to reduce reflectance comprising four layers of material, each layer respectively having an optical thickness with respect to a preselected design wavelength $\lambda_o$, and the relationship between the indices of refractions between the substrate, $N_s$, and the layers are as follows:

$N_4, N_2 > N_s, N_3 > N_1$ wherein N refers to the index of refraction and the subnumber refers to the layer sequentially numbered from the layer farthest from the substrate, $N_1$, to the adjacent layer $N_4$.

6. The invention of claim 5 wherein $N_4$ is equal to $N_2$.

7. The invention of claim 5 wherein the optical thickness, $N_4 d_4$, of the layer adjacent the substrate is less than $0.040 \lambda_o$.

8. The invention of claim 7 wherein the optical thickness, $N_4 d_4$, of the layer adjacent the substrate is within the following range:

$0.040 \lambda_o > N_4 d_4 > 0.010 \lambda_o$

9. The invention of claim 8 wherein the optical thickness, $N_3 d_3$, of the third layer is equal or greater than $0.500 \lambda_o$ and equal or less than $0.750 \lambda_o$.

10. The invention of claim 5 wherein the substrate is a glass having an index of refraction in the range of 1.4 to 1.9.

11. The invention of claim 5 wherein the first layer is selected from a group consisting of $MgF_2$, $LaF_2$, $Na_3(AlF_4)$ and $SiO_2$.

12. The invention of claim 5, wherein the second and fourth layers are selected from a group consisting of $ZrO_2$, $TiO_2$, $CeO_2$, $HfO_2$, ZnS and a mixture of $ZrO_2$ and $TiO_2$.

13. The invention of claim 5 wherein the third layer is selected from a group consisting of $Al_2O_3$, $CeF_3$, $Y_2O_3$, $Gd_2O_3$ and MgO.

14. The invention of claim 5 wherein the optical thickness, $N_3 d_3$, of the third layer is equal or greater than $0.500 \lambda_o$ and equal or less than $0.750 \lambda_o$.

15. The invention of claim 5 wherein the refractive indices are as follows:

$1.35 \leq N_1 \leq 1.62$;
$1.90 \leq N_2 \leq 2.30$;
$1.90 \leq N_4 \leq 2.30$;
$1.56 \leq N_3 \leq 1.80$.

16. The invention of claim 15 wherein $N_3$ is greater than $N_1$.

17. The invention of claim 15 wherein the optical thicknesses are as follows:

$N_1 d_1 \approx 0.250 \lambda_o$;
$N_2 d_2 \approx 0.500 \lambda_o$;
$0.500 \lambda_o \leq N_3 d_3 \leq 0.750 \lambda_o$;
$N_4 d_4 < 0.250 \lambda_o$.

18. A multi-layered anti-reflection coating for use with a substrate to reduce reflectance comprising four layers of material, each layer respectively having an effective optical thickness, Nd, of a preselected design wavelength $\lambda_o$ as follows:

$N_1d_1 \approx 0.250 \lambda_o$;

$N_2d_2 \approx 0.500 \lambda_o$;

$0.500 \lambda_o \leq N_3d_3 \leq 0.750 \lambda_o$;

$N_4d_4 < 0.040 \lambda_o$.

wherein the subnumber refers to the layer sequentially numbered from the layer farthest from the substrate, $N_1d_1$, to the adjacent layer $N_4d_4$.

19. The invention of claim 18 wherein the optical thickness, $N_4d_4$, of the layer adjacent the substrate is within the following range:

$0.040 \lambda_o > N_4d_4 > 0.010 \lambda_o$.

20. The invention of claim 19 wherein the relationship between the indices of refraction are as follows:

$N_4, N_2 > N_s, N_3 > N_1$;

wherein N refers to the index of refraction and the subnumber refers to the layer sequentially numbered from the layer farthest from the substrate, $N_1$, to the adjacent layer $N_4$ with $N_s$ referring to the substrate.

21. The invention of claim 20 wherein the refractive indices are as follows:

$1.35 \leq N_1 \leq 1.62$;

$1.90 \leq N_2 \leq 2.30$;

$1.90 \leq N_4 \leq 2.30$;

$1.56 \leq N_3 \leq 1.80$.

22. The invention of claim 18 wherein the first layer is selected from a group consisting of $MgF_2$, $LaF_2$, $Na_3(AlF_4)$ and $SiO_2$.

23. The invention of claim 18 wherein the second and fourth layers are selected from a group consisting of $ZrO_2$, $TiO_2$, $CeO_2$, $HfO_2$, ZnS and a mixture of $ZrO_2$ and $TiO_2$.

24. The invention of claim 18 wherein the third layer is selected from a group consisting of $Al_2O_3$, $CeF_3$, $Y_2O_3$ and MgO.

* * * * *